US012746788B1

(12) United States Patent
Den Boer et al.

(10) Patent No.: US 12,746,788 B1
(45) Date of Patent: Sep. 29, 2026

(54) HITCH INTERFACE APPARATUS AND SYSTEM THEREFOR

(71) Applicants: Nolan Den Boer, Rock Valley, IA (US); Nicholas Vande Waerdt, Rock Valley, IA (US)

(72) Inventors: Nolan Den Boer, Rock Valley, IA (US); Nicholas Vande Waerdt, Rock Valley, IA (US)

(73) Assignee: Kooima Ag, Inc., Rock Valley, IA (US)

( * ) Notice: Subject to any disclaimer, the term of this patent is extended or adjusted under 35 U.S.C. 154(b) by 349 days.

(21) Appl. No.: 18/444,850

(22) Filed: Feb. 19, 2024

Related U.S. Application Data

(60) Provisional application No. 63/446,985, filed on Feb. 20, 2023.

(51) Int. Cl.
*B60D 1/07* (2006.01)
*B60D 1/30* (2006.01)

(52) U.S. Cl.
CPC ............... *B60D 1/075* (2013.01); *B60D 1/30* (2013.01)

(58) Field of Classification Search
CPC .............................. B62D 53/08; B62D 53/067
USPC ............. 280/504, 455.1, 425.2, 417.1, 441.2
See application file for complete search history.

(56) References Cited

U.S. PATENT DOCUMENTS 8,302,987 B2 * 11/2012 Williams, Jr. ........... B60D 1/46 280/479.3
2015/0105975 A1 * 4/2015 Dunn ..................... B60D 1/322 188/266.5

FOREIGN PATENT DOCUMENTS

AU 6255194 A * 9/1994

* cited by examiner

*Primary Examiner* — Alentin Neacsu
*Assistant Examiner* — Morgan Knauf
(74) *Attorney, Agent, or Firm* — Jeffrey A. Proehl; Woods, Fuller, Shultz & Smith PC

(57) ABSTRACT

A system may comprise a hitch interface apparatus configured to interface with a hitch structure of a towing vehicle. The hitch interface apparatus may include a hitch structure engagement portion configured to engage the hitch structure of the towing vehicle, and a hitch element support portion configured to support a hitch element. Optionally, embodiments may include a lateral stabilization structure configured to stabilize the hitch interface apparatus against lateral movement with respect to the hitch structure.

20 Claims, 6 Drawing Sheets

HITCH INTERFACE APPARATUS AND SYSTEM THEREFOR

REFERENCE TO RELATED APPLICATIONS

This non-provisional application claims the priority benefit of U.S. Provisional Patent Application No. 63/446,985, filed Feb. 20, 2023, which is hereby incorporated by reference in its entirety.

BACKGROUND

Field

The present disclosure relates to tow hitch apparatus and more particularly pertains to a new hitch interface apparatus and system therefor.

SUMMARY

In some aspects, the present disclosure relates to a system comprising a hitch interface apparatus configured to interface with a hitch structure of a towing vehicle. The hitch interface apparatus may comprise a hitch structure engagement portion configured to engage the hitch structure of the towing vehicle, and a hitch element support portion configured to support a hitch element. In optional embodiments, the hitch interface apparatus may include a lateral stabilization structure configured to stabilize the hitch interface apparatus against lateral movement with respect to the hitch structure.

In other aspects, present disclosure relates to a system comprising a hitch structure of a towing vehicle, with the hitch structure forming a hitch pin opening for receiving a hitch pin. The hitch pin opening may extend along a substantially vertical axis. The system may also include a hitch interface apparatus which is interfaced with the hitch structure of the towing vehicle. The hitch interface apparatus may comprise a hitch structure engagement portion engaging the hitch structure of the towing vehicle, and a hitch element support portion connected to the hitch structure engagement portion. A hitch element may be mounted on the hitch element support portion. The hitch interface apparatus may also include a lateral stabilization structure which is configured to contact the hitch structure and resists lateral movement of the hitch interface apparatus with respect to the hitch structure.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
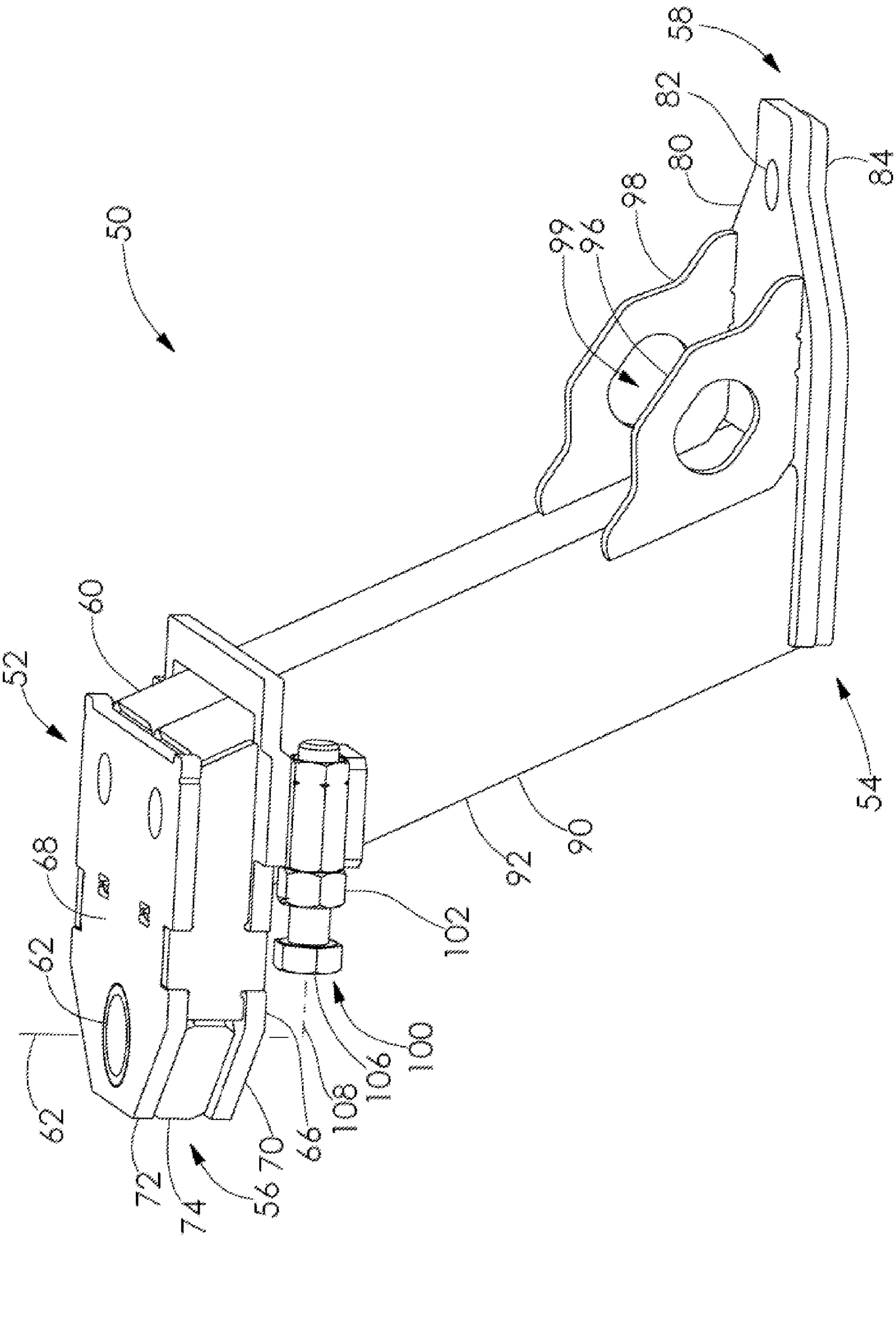
FIG. 1 is a schematic side view of a new hitch interface apparatus according to the present disclosure.
Figure 2:
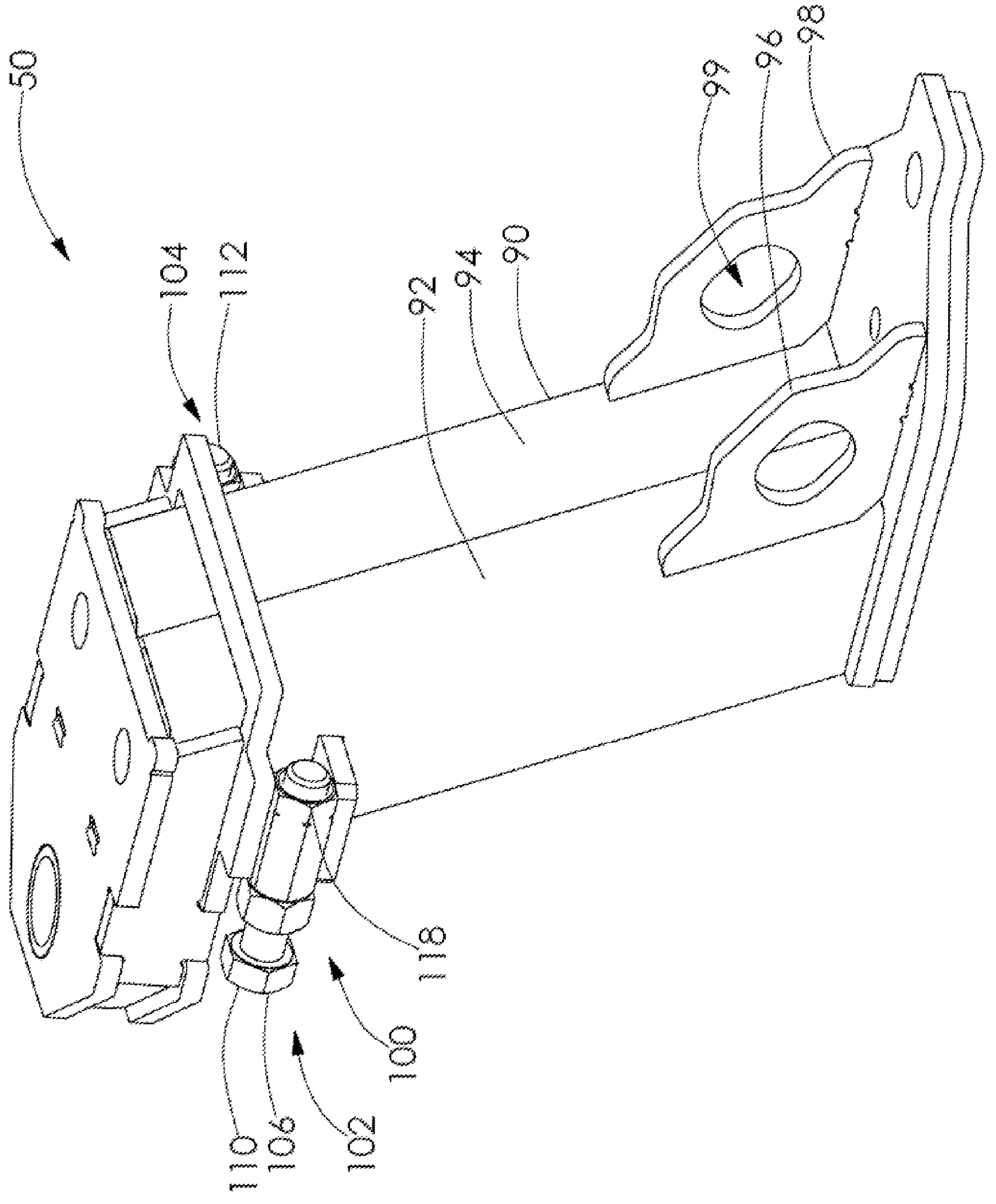
FIG. 2 is a schematic partial side view of the hitch interface apparatus, according to an illustrative embodiment.
Figure 3:
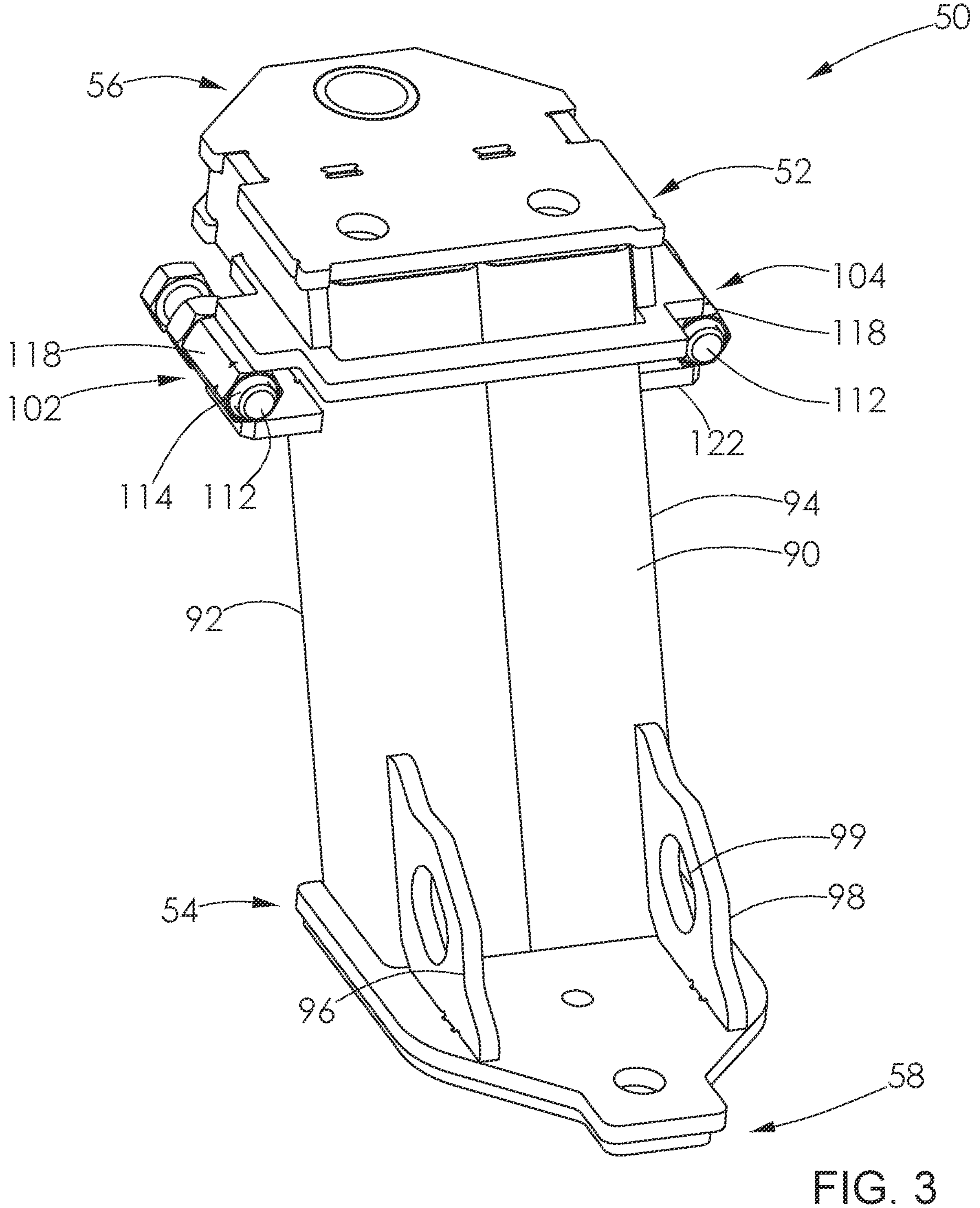
FIG. 3 is a schematic end view of the hitch interface apparatus, according to an illustrative embodiment.
Figure 4:
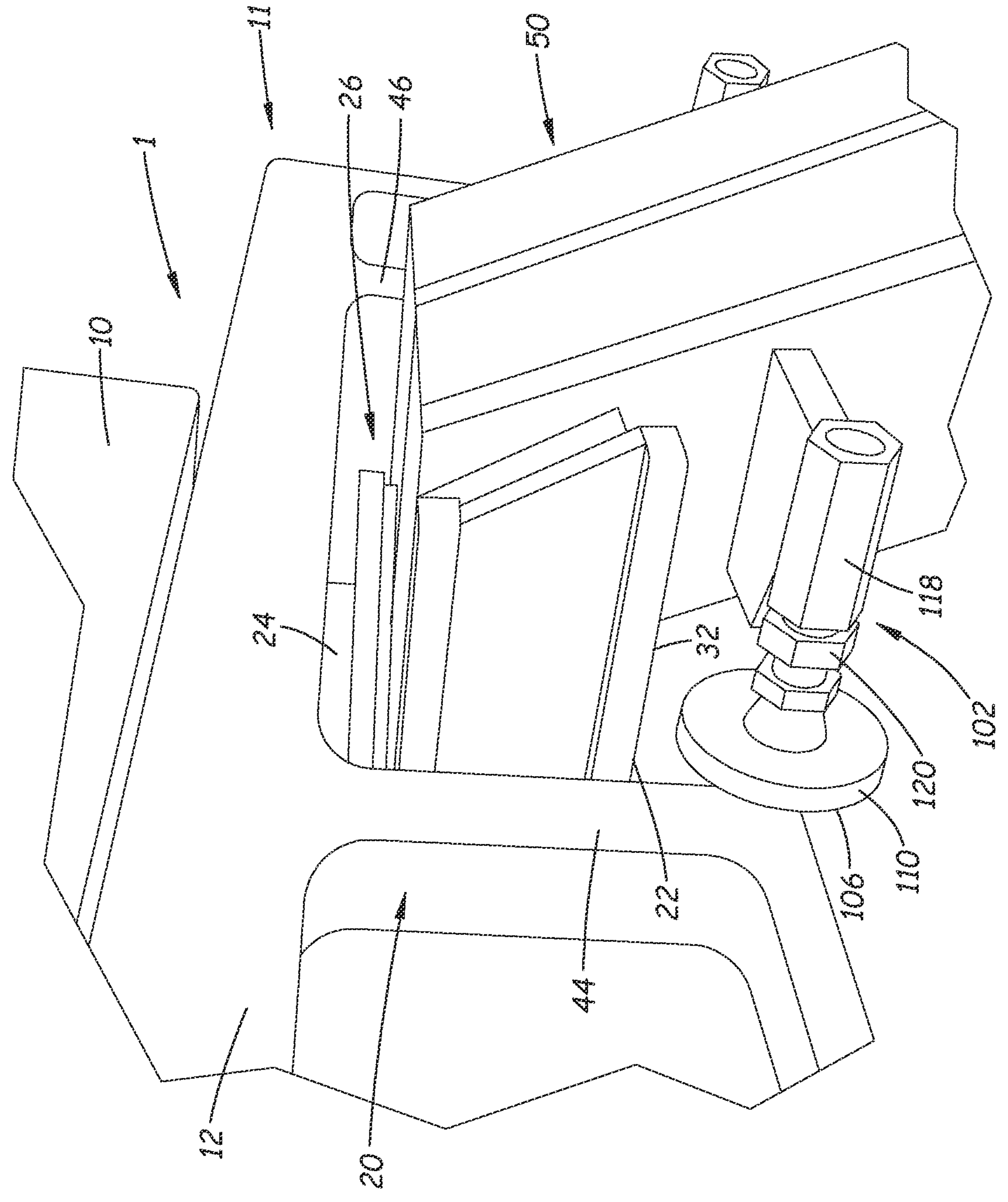
FIG. 4 is a schematic side view of a portion of the hitch interface apparatus mounted on the hitch structure of the vehicle, according to an illustrative embodiment.
Figure 5:
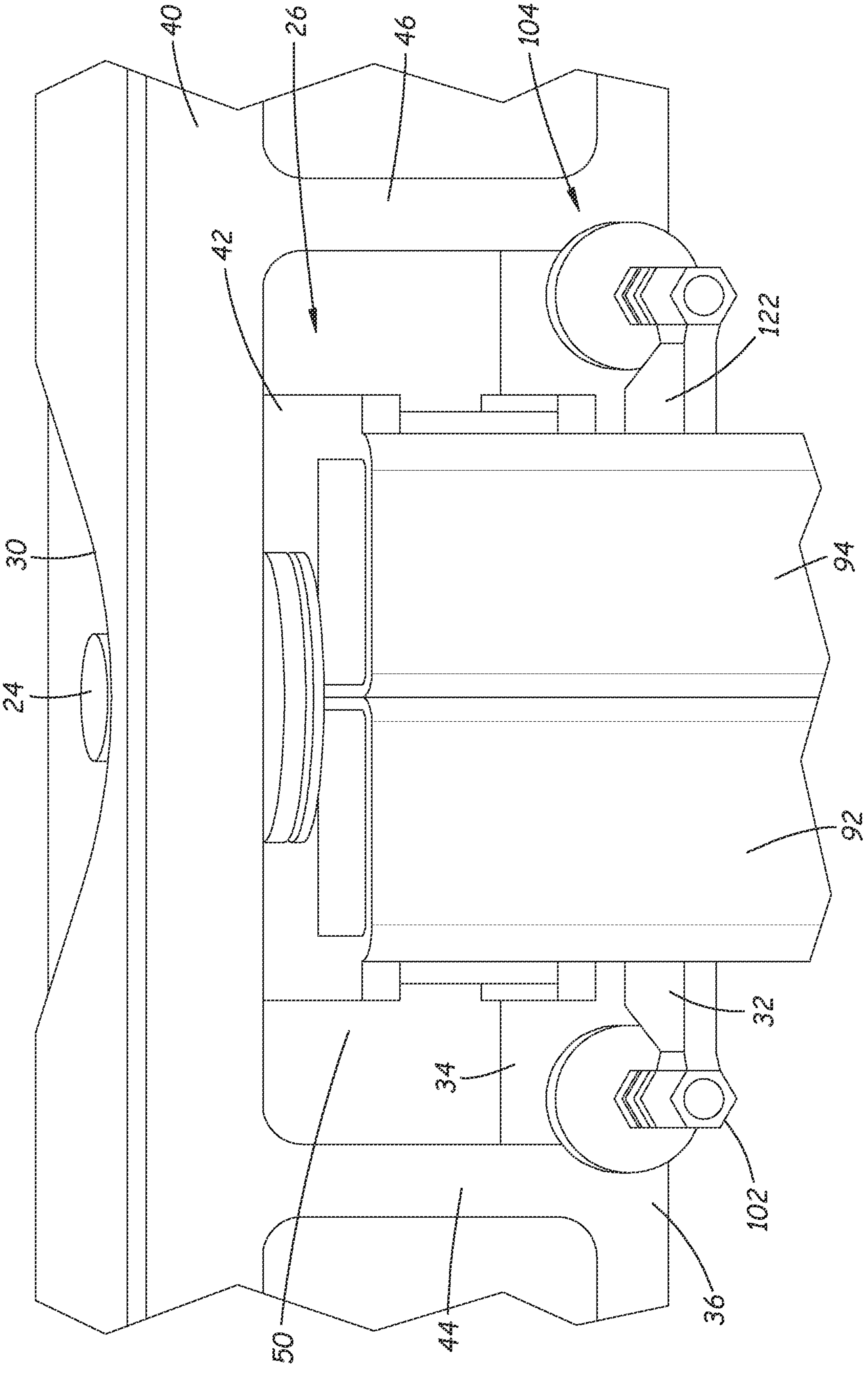
FIG. 5 is a schematic end view of a portion of the hitch interface apparatus mounted on the hitch structure of the vehicle, according to an illustrative embodiment.
Figure 6:
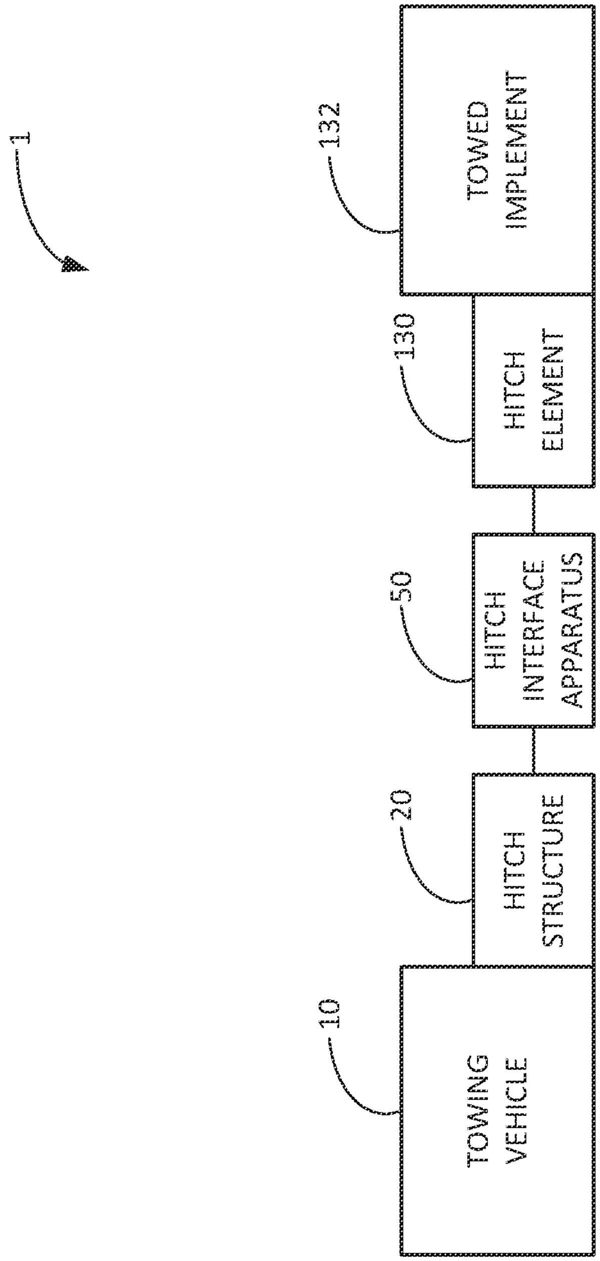
FIG. 6 is a schematic diagram of the system, according to an illustrative embodiment.

With reference now to the drawings, and in particular to FIGS. 1 through 6 thereof, a new hitch interface apparatus and system embodying the principles and concepts of the disclosed subject matter will be described.

The applicants have recognized that situations may occur in which it is desirable to have a trailer be towed by a vehicle that is not designed to tow trailers, or at least trailers of the type which is desired to be towed by the vehicle. Moreover, significant vertical height differences may occur between the towing structure on the vehicle and the ideal height of the trailer tongue when being towed, such as to maintain proper weight distribution for the trailer.

The applicants also recognize that hitch adapters of various types are known, but also may suffer from instability depending upon the type of hitch structure of the vehicle. For example, most hitch structures are configured to permit a high degree of free movement of a trailer tongue when attached to the hitch structure to facilitate turning and travel over contoured surfaces, but that aspect of conventional hitch structures does not provide a stable base for mounting an adapter intended to remedy, for example, the height difference or hitch design incompatibilities.

The applicants have devised a hitch interface apparatus that may be utilized as a part of a system that may include a towing vehicle and a trailer in circumstances when the trailer and towing vehicle might not have suitable compatibility. Such an apparatus may include a capability to stabilize the apparatus with respect to the hitch structure of the vehicle.

In some aspects, the disclosure contemplates a system 1 for implementing the pulling or towing of a trailing vehicle (e.g., a trailer) by another vehicle (e.g., a towing vehicle). In some implementations of the system 1, the system includes a towing vehicle 10, the vehicle having a front generally oriented in the direction of normal forward movement of the vehicle, and a rear 11 typically oriented in a direction away from the direction of normal forward movement. The vehicle 10 may generally comprise a frame and a plurality of wheels mounted on the frame to permit the frame as well elements mounted on the frame, to move over the ground surface. Additionally, the vehicle 10 may include a motor mounted on the frame, and may be of any suitable type, such as, for example, a combustion engine or an electrical motor.

The vehicle may also include a hitch structure 20 which is positioned at the rear 11 of the vehicle and typically is united with the frame, and may be united with a rear protective element such as a bumper. The hitch structure 20 may form a hitch pin opening for receiving a hitch pin 24, which may extend along a substantially vertical axis when the pin is positioned in the pin opening. In some vehicle implementations, the hitch structure 20 may define a hitch recess 26 which may be located above the hitch pin opening. In many embodiments, the hitch pin opening may comprise a lower hitch pin opening, and the hitch structure may additionally form an upper hitch pin opening. The upper hitch pin opening may extend along a substantially vertical axis, and the upper and lower hitch pin openings may be oriented along a common vertical axis to permit the hitch pin 24 to be simultaneously received in both the upper and lower hitch pin openings.

In illustrative embodiments, the hitch structure 20 includes a lower element 32 which forms the lower hitch pin opening and may have an upper surface 34 through which the lower hitch pin opening extends. The lower element 32 may be located below the hitch recess 26. The lower element 32 may have a rear surface 36 which may be oriented generally perpendicular to the upper surface 34 and may extend downwardly from the upper surface. Additionally, illustrative embodiments of the hitch structure 20 may include an upper element 40 that forms the upper hitch pin opening, and that may have a lower surface 42 through which the lower hitch pin opening extends. The upper element 40 may be located above the hitch recess 26.

In some embodiments, the hitch structure 20 may include at least one lateral element 44 extending between the lower 32 and upper 40 elements, and may comprise a pair of the lateral elements 44, 46 which may be laterally offset from the lower 22 and upper 30 hitch pin openings. In embodiments, the pair of lateral elements may be laterally spaced or separated from each other in a substantially horizontal direction, and from one or both of the hitch pin openings in a substantially horizontal direction. The hitch recess 26 may be located between the lateral elements.

Aspects of the system 1 may include, in combination with the vehicle and the hitch structure or independent of the vehicle and the hitch structure, a hitch interface apparatus 50 which is configured to interface with the hitch structure of the towing vehicle. Generally, the hitch interface apparatus 50 has a top 52 and a bottom 54 when the apparatus 50 is oriented for interfacing with (such as being mounted on) the hitch structure. Similarly, the hitch interface apparatus 50 may have a forward end 56 and a rearward end 58 based upon the orientation of the apparatus when mounted on the hitch structure 20.

In the illustrative embodiments, the hitch interface apparatus 50 may comprise a hitch structure engagement portion configured to engage the hitch structure of a towing vehicle and which may be formed by an upper portion 60 of the apparatus 50. The upper portion 60 may extend to the forward end 56 of the apparatus 50, and may define a pin channel 62 for receiving a portion of the hitch pin 24. The pin channel 62 may be alignable with the hitch pin opening of the hitch structure when the apparatus 50 is positioned for use. The pin channel 62 extends along a channel axis 64 which may be aligned with the common vertical axis of the lower and upper hitch pin openings of the structure 20.

The upper portion 60 of the interface apparatus may be configured for engaging the lower element 32 of the hitch structure, such as by resting on the upper surface 34 of the element 32. The upper portion 60 may have a lower support face 66 for resting upon the upper surface 34 of the lower element. The lower support face 66 may be downwardly oriented when the hitch interface apparatus 50 is oriented for interfacing with the hitch structure. The pin channel 62 may open into the lower support face 66. The upper portion 60 may further comprise an upper face 68 which is positioned on the portion 60 and is oriented opposite of the lower support face 66. The pin channel 62 may further open into the upper face 68.

Illustratively, the lower support face 66 may be formed by a lower plate 70 and the upper face 68 may be formed by an upper plate 72. The upper 72 and lower 70 plates may be substantially horizontally oriented when the hitch interface apparatus is oriented for interfacing with the hitch structure, and may be vertically spaced from each other. The upper portion 60 may further include a box wall 74 that extends between the lower 70 and upper 72 plates.

The hitch interface apparatus 50 may further include a hitch element support portion configured to support a hitch element or implement and which may be formed by a lower portion 80 of the apparatus 50. The lower portion 80 may extend to the rearward end 58 of the hitch interface apparatus, and may define a hitch aperture 82 for receiving a portion of the hitch element or implement. In illustrative embodiments, the lower portion 80 may include a bottom plate 84 which may be substantially horizontally oriented when the hitch interface apparatus 50 is oriented for interfacing with the hitch structure. The hitch aperture 82 may extend through the bottom plate 84.

In the illustrative embodiments, the hitch structure engagement, or upper, portion 60 may be located at a first vertical level above the ground surface during use, and the hitch element support, or lower, portion 80 may be located at a second vertical level above the ground surface interface, and the first vertical level the be higher, or further from, the ground surface than the second vertical level, to effectively position the hitch element at a lower level than the hitch structure of the towing vehicle.

The hitch interface apparatus 50 may further include a transitional or medial portion 90 that extends between the upper 60 and lower 80 portions, and may be mounted on the upper and lower portions to unite or connect the upper and lower portions together such that the medial portion 90 supports the lower portion on the upper portion. Illustratively, the medial portion 90 may be tubular in character between the upper 60 and lower 80 portions. The medial portion 90 may be formed by a tube 92 that extends between the upper and lower portions, and in some illustrative embodiments, the medial portion may be formed by a pair of tubes 92, 94 that extend between the upper and lower portions, and the tube or tubes may be substantially rectangular in cross-section. The illustrative embodiments of the medial portion 90 have an inclined orientation with respect to a vertical axis when the hitch interface apparatus is oriented for interfacing with the hitch structure. Optionally, the medial portion 90 may include at least one gusset 96 that extends between the lower portion 80 and the medial portion 90 for strengthening the bond between the lower portion and the medial portion, as well as providing additional support to the lower portion. A pair of gussets 96, 98 may be utilized, and the gusset or gussets may have a hook aperture 99 formed therein.

In embodiments, the hitch interface apparatus 50 may include a lateral stabilization structure 100 which is configured to stabilize the hitch interface apparatus against lateral movement with respect to the hitch structure, such as, for example, pivot movement of the apparatus 50 about the hitch pin 24 when mounted on the hitch structure 20. For example, the lateral stabilization structure 100 may resist or effectively prevent pivot movement of the hitch interface apparatus 50 with respect to the hitch structure, such as movement by pivoting of the apparatus 50 about the hinge pin 24. In the illustrative embodiments, the lateral stabilization structure 100 may be configured to contact areas or surfaces of the hitch structure 20 when the apparatus 50 is mounted on the structure 20, such as by contacting the structure 20 at a location or locations that are separated from the hitch pin 24 and the pin openings and pin channel 62. In the illustrative embodiments, the stabilization structure 100 may act against the lower element 32 of the hitch structure 20, such as through contact with the rear surface 36 of the lower element.

The lateral stabilization structure 100 may be adjustable to adjust the manner in which the structure engages the rear surface of the lower element when the hitch interface apparatus is mounted on the hitch structure. The stabilization structure 100 may be mounted on the medial portion 90 of the hitch interface apparatus, but other locations may be utilized in view of the present disclosure.

In the illustrative embodiments, the lateral stabilization structure 100 may comprise at least one stabilization assembly 102 which is adjustably extendable and retractable with respect to the hitch interface apparatus, such as the medial portion 90. Illustratively, a pair of the stabilization assemblies 102, 104 may be utilized, with each of the assemblies 102, 104 being positioned on opposite lateral sides of the apparatus 50 at opposite offsets from the pin channel 62. For the purposes of this description, the stabilization assembly 102 will be described with the understanding that the stabilization assembly 104 may be of similar or different configuration.

Each stabilization assembly may have a contact surface 106 for contacting one of the surfaces of the hitch structure laterally spaced or separated from the hitch pin opening of the hitch structure, such as, for example, the rear surface 36 of the lower element. The contact surfaces 106 of the assemblies 102, 104 may be configured to engage the lower element at different and spaced locations with respect to each other. Each contact surface 106 may be abuttable against the rear surface 36 to press against the rear surface with an adjustable amount of pressure. To provide the adjustable degree of pressure, the position of each contact surface may be adjustably movable along an adjustment axis 108 that is laterally offset from the channel axis 64, and the adjustment axes of the stabilization assemblies 102, 104 may be offset on opposite lateral sides of the channel axis. In some embodiments, each adjustment axis 108 is substantially horizontally oriented when the hitch interface apparatus 50 is oriented for interfacing with the hitch structure to permit each contact surface to be adjustably movable in a substantially horizontal direction with respect to the medial portion, and to apply pressure against a substantially vertically oriented rear surface 36.

In the illustrative embodiments, each assembly 102, 104 may include an adjustment rod 112 on which the contact surface 106 is located, and the adjustment rod may extend along the adjustment axis of the respective stabilization assembly to adjust the surface 106 along the axis. In the illustrative embodiments, the adjustment rod 112 may have a threaded surface 114. Optionally, each stabilization assembly 102, 104 may also include a contact pad 110 located on an end of the adjustment rod, and the contact pad may have the contact surface thereon. Illustratively, the contact pad 110 and the adjustment rod 112 may be collectively formed by a bolt fastener, with the pad 110 being formed by the head of the bolt fastener and the rod 112 being formed by the shaft of the bolt fastener. As a further option, the contact pad 110 may be formed by a separate piece which is swivelable with respect to the adjustment rod.

Each stabilization assembly 102, 104 may further include an adjustment channel 118 which may be supported on the medial portion 90, and the adjustment channel may receive a portion of the adjustment rod. The adjustment channel 118 may have a threaded interior surface to engage threads formed on the adjustment rod 112. The adjustment channel 118 may extend along the adjustment axis 108 such that rotation of the rod with respect to the channel advances the contact surface 106 toward the hitch structure or away from the hitch structure in an adjustable manner. For example, rotation of the adjustment rod 112 in a first rotational direction may move the contact surface toward the lateral element of the hitch structure, and rotation of the rod 112 in a second rotational direction moves the contact surface of the pad 110 away from the lateral element. In some implementations, each stabilization assembly may include a locking nut 120 threadedly mounted on the adjustment rod 118 to selectively bear against an end of the adjustment channel to permit selective locking of the adjustment rod against rotation with respect to the adjustment channel between times of intentional adjustment. Each stabilization assembly may also include a spacing flange 122 which spaces the adjustment channel 118 from the medial portion 90, and may extend between the channel 118 and the medial portion.

The system 1 may further include a hitch element 130 mounted on the hitch interface apparatus 50, and may be supported by the apparatus 50 in a position above the ground surface. In some illustrative embodiments, the hitch element 130 may comprise a hitch ball having a portion extending through the hitch aperture 82 to mount the ball on the interface. In other embodiments, the hitch element 130 may comprise a device that facilitates the hitching and unhitching of a towed implement 132 (such as a trailer) behind the towing vehicle 10 and the interface apparatus 50.

It should be appreciated that in the foregoing description and appended claims, that the terms "substantially" and "approximately," when used to modify another term, mean "for the most part" or "being largely but not wholly or completely that which is specified" by the modified term, and may be further quantified as values or qualities which deviate approximately 10 percent or less from the value or quality or relationship stated in the disclosure.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that “A or B” includes “A but not B,” “B but not A,” and “A and B,” unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A system comprising:

a hitch interface apparatus configured to interface with a hitch structure of a towing vehicle, the hitch interface apparatus comprising:

a hitch structure engagement portion configured to engage the hitch structure of the towing vehicle at a first vertical level;

a hitch element support portion configured to support a hitch element at a second vertical level, the second vertical level being different than the first vertical level; and a lateral stabilization structure configured to resist lateral movement of the hitch interface apparatus with respect to the hitch structure;

wherein the hitch structure of the towing vehicle is characterized by having a hitch pin opening and at least one lateral element which is laterally separated in a substantially horizontal direction from the hitch pin opening; and wherein the lateral stabilization structure includes at least one stabilization assembly for contacting the at least one lateral element of the hitch structure to resist movement of the hitch interface apparatus toward the at least one lateral element.

2. The system of claim 1 wherein the hitch interface apparatus additionally comprises a transitional portion connecting the hitch element support portion to the hitch structure engagement portion; and wherein the lateral stabilization structure is mounted on the transitional portion.

3. The system of claim 1 wherein the hitch structure of the towing vehicle is characterized by having a pair of lateral elements laterally offset from the hitch pin opening with the hitch pin opening being positioned between the lateral elements; and wherein the lateral stabilization structure includes a pair of the stabilization assemblies each configured to contact one of the lateral elements of the hitch structure to resist movement of the hitch interface apparatus toward each of the lateral elements.

4. The system of claim 3 wherein each of the stabilization assemblies of the lateral stabilization structure includes a contact surface for contacting a surface of a respective one of the pair of lateral elements of the hitch structure;

wherein the pair of stabilization assemblies are configured to adjust positions of the contact surfaces toward and away from the surface of the lateral elements;

wherein the hitch structure engagement portion defines a pin channel for receiving a portion of a hitch pin extending through the hitch pin opening of the hitch structure of the towing vehicle, the pin channel having a channel axis; and wherein each of the contact surfaces is adjustably movable along an adjustment axis which is laterally offset from the channel axis of the pin channel to contact the at least one lateral element of the hitch structure, the adjustment axes along which the contact surfaces are adjustable being located on opposite lateral sides of the channel axis of the pin channel.

5. The system of claim 1 wherein the at least one stabilization assembly of the lateral stabilization structure includes a contact surface for contacting a surface of the at least one lateral element of the hitch structure, the at least one stabilization assembly being configured to adjust a position of the contact surface toward and away from the surface of the at least one lateral element.

6. The system of claim 5 wherein the hitch structure engagement portion defines a pin channel for receiving a portion of a hitch pin extending through the hitch pin opening of the hitch structure of the towing vehicle, the pin channel having a channel axis; and wherein the contact surface is adjustably movable along an adjustment axis which is laterally offset from the channel axis of the pin channel to contact the at least one lateral element of the hitch structure.

7. The system of claim 6 wherein the hitch interface apparatus is configured such that the adjustment axis is substantially horizontally oriented when the hitch interface apparatus is mounted on the hitch structure of the towing vehicle.

8. The system of claim 5 wherein the at least one stabilization assembly of the lateral stabilization structure includes an adjustment rod on which the contact surface is located, the adjustment rod being adjustable to move the contact surface toward and away from the at least one lateral element of the hitch structure when the hitch interface apparatus is mounted on the hitch structure.

9. The system of claim 8 wherein the at least one stabilization assembly of the lateral stabilization structure includes a contact pad mounted on an end of the adjustment rod and having the contact surface thereon.

10. The system of claim 8 wherein the adjustment rod has a threaded surface; and wherein the at least one stabilization assembly of the lateral stabilization structure includes an adjustment channel receiving a portion of the adjustment rod, the adjustment channel having a threaded interior surface engaging the threaded surface of the adjustment rod such that rotation of the adjustment rod in a first rotational direction moves the contact surface toward the at least one lateral element of the hitch structure when the hitch interface apparatus is mounted on the hitch structure, and rotation of the adjustment rod in a second rotational direction moves the contact surface away from the at least one lateral element when the hitch interface apparatus is mounted on the hitch structure.

11. A system comprising:

a hitch structure of a towing vehicle, the hitch structure forming a hitch pin opening for receiving a hitch pin, the hitch pin opening extending along a substantially vertical axis;

a hitch interface apparatus interfaced with the hitch structure of the towing vehicle, the hitch interface apparatus comprising:

a hitch structure engagement portion engaging the hitch structure of the towing vehicle;

a hitch element support portion connected to the hitch structure engagement portion, a hitch element being mounted on the hitch element support portion; and a lateral stabilization structure configured to contact the hitch structure and resist lateral movement of the hitch interface apparatus with respect to the hitch structure;

wherein the hitch structure is characterized by having a pair of lateral elements laterally separated in a substantially horizontal direction from the hitch pin opening such that the hitch pin opening is positioned between the lateral elements; and wherein the lateral stabilization structure includes a pair of the stabilization assemblies with each stabilization assembly contacting one of the lateral elements of the hitch structure to resist pivot movement of the hitch interface apparatus on the hinge pin toward each of the lateral elements.

12. The system of claim 11 wherein the hitch structure includes a lower element defining a lower hitch pin opening and having an upper surface, the hitch structure engagement portion resting upon the upper surface of the lower element and defining a pin channel aligned with the lower hitch pin opening, a hitch pin extending through the pin channel and the lower hitch opening.

13. The system of claim 11 wherein each of the stabilization assemblies has a contact surface which is adjustably movable along an adjustment axis which is laterally offset from a channel axis of the pin channel to contact one of the lateral elements of the hitch structure.

14. The system of claim 13 wherein the hitch interface apparatus is configured such that each of the adjustment axes is substantially horizontally oriented when the hitch interface apparatus is mounted on the hitch structure of the towing vehicle.

15. The system of claim 13 wherein the pair of stabilization assemblies are configured to adjust positions of the contact surfaces toward and away from the surface of the lateral elements, and wherein each of the contact surfaces is adjustably movable along an adjustment axis which is laterally offset from the channel axis of the pin channel to contact the at least one lateral element of the hitch structure, the adjustment axes along which the contact surfaces are adjustable being located on opposite lateral sides of the channel axis of the pin channel.

16. The system of claim 13 wherein each of the stabilization assemblies of the lateral stabilization structure includes:

an adjustment rod on which the contact surface is located, the adjustment rod being adjustable to move the contact surface toward and away from the lateral elements of the hitch structure.

17. The system of claim 11 wherein the lateral stabilization structure includes a pair of the stabilization assemblies with each stabilization assembly contacting one of the lateral elements of the hitch structure to resist pivot movement of the hitch interface apparatus on the hinge pin toward each of the lateral elements; and wherein each of the stabilization assemblies has a contact surface which is adjustably movable along an adjustment axis which is laterally offset from a channel axis of the pin channel to contact a lateral element of the hitch structure.

18. The system of claim 17 wherein the hitch interface apparatus is configured such that each of the adjustment axes is substantially horizontally oriented when the hitch interface apparatus is mounted on the hitch structure of the towing vehicle.

19. The system of claim 17 wherein the pair of stabilization assemblies are configured to adjust positions of the contact surfaces toward and away from the surface of the lateral elements, and wherein each of the contact surfaces is adjustably movable along an adjustment axis which is laterally offset from the channel axis of the pin channel to contact at least one lateral element of the hitch structure, the adjustment axes along which the contact surfaces are adjustable being located on opposite lateral sides of the channel axis of the pin channel.

20. A system comprising:

a hitch structure of a towing vehicle, the hitch structure forming a hitch pin opening for receiving a hitch pin, the hitch pin opening extending along a substantially vertical axis;

a hitch interface apparatus interfaced with the hitch structure of the towing vehicle, the hitch interface apparatus comprising:

a hitch structure engagement portion engaging the hitch structure of the towing vehicle;

a hitch element support portion connected to the hitch structure engagement portion, a hitch element being mounted on the hitch element support portion; and a lateral stabilization structure configured to contact the hitch structure and resist lateral movement of the hitch interface apparatus with respect to the hitch structure;

wherein the hitch structure includes a lower element defining a lower hitch pin opening and having an upper surface, the hitch structure engagement portion resting upon the upper surface of the lower element and defining a pin channel aligned with the lower hitch pin opening, a hitch pin extending through the pin channel and the lower hitch opening.

* * * * *